US012597214B2

(12) United States Patent
    Spong

(10) Patent No.: US 12,597,214 B2
(45) Date of Patent: Apr. 7, 2026

(54) SCANNABLE CODES AS LANDMARKS FOR AUGMENTED-REALITY CONTENT

(71) Applicant: Snap Inc., Santa Monica, CA (US)

(72) Inventor: Mason Spong, Provo, UT (US)

(73) Assignee: Snap Inc., Santa Monica, CA (US)

( * ) Notice: Subject to any disclaimer, the term of this patent is extended or adjusted under 35 U.S.C. 154(b) by 267 days.

(21) Appl. No.: 18/136,768

(22) Filed: Apr. 19, 2023

(65) Prior Publication Data

US 2024/0355059 A1 Oct. 24, 2024

(51) Int. Cl.
    *G06T 19/00* (2011.01)
    *G06K 7/14* (2006.01)
(52) U.S. Cl.
    CPC .......... *G06T 19/006* (2013.01); *G06K 7/1417* (2013.01); *G06K 7/1443* (2013.01)
(58) Field of Classification Search
    None
    See application file for complete search history.

(56) References Cited

U.S. PATENT DOCUMENTS

| | | | | |
|---|---|---|---|---|
| 10,146,971 B1 * | 12/2018 | Cansizoglu | ........ | G06K 7/10722 |
| 2017/0323488 A1 * | 11/2017 | Mott | .................. | G06Q 30/0643 |

OTHER PUBLICATIONS

Zhu et al. Design of the PromoPad: an automated augmented-Reality shopping assistant, Dec. 31, 2008, IGI Publishing, p. 41-56 (Year: 2008).*

* cited by examiner

*Primary Examiner* — Robert J Craddock
(74) *Attorney, Agent, or Firm* — Schwegman Lundberg & Woessner, P.A.

(57) ABSTRACT
A system to perform operations that include: generating, at a client device, a scan request that comprises image data, the image data comprising a depiction of a coded image that comprises a reference to a media repository; determining a set of coordinates that indicate a position and orientation of the coded image within a three-dimensional (3D) Euclidean space responsive to the scan request; defining a reference point at the client device based on the set of coordinates that indicate the position and orientation of the coded image within the 3D Euclidean space; accessing media content from within the media repository based on the reference to the media content associated with the coded image, wherein the media content may include AR content; and causing display of a presentation of the media content at the client device based on the reference point.

19 Claims, 10 Drawing Sheets

300

GENERATING, AT A CLIENT DEVICE, A SCAN REQUEST THAT COMPRISES IMAGE DATA THAT DEPICTS A CODED IMAGE, THE CODED IMAGE COMPRISING A REFERENCE TO A MEDIA REPOSITORY
302

DETERMINING A SET OF COORDINATES THAT INDICATE A POSITION AND ORIENTATION OF THE CODED IMAGE WITHIN A 3D EUCLIDEAN SPACE RESPONSIVE TO THE SCAN REQUEST
304

DEFINING A REFERENCE POINT AT THE CLIENT DEVICE BASED ON THE SET OF COORDINATES THAT INDICATE THE POSITION AND ORIENTATION OF THE CODED IMAGE WITHIN THE 3D EUCLIDEAN SPACE
306

ACCESSING MEDIA CONTENT FROM WITHIN THE MEDIA REPOSITORY BASED ON THE REFERENCE TO THE MEDIA REPOSITORY ASSOCIATED WITH THE CODED IMAGE
308

CAUSING DISPLAY OF A PRESENTATION OF THE MEDIA CONTENT AT THE CLIENT DEVICE BASED ON THE REFERENCE POINT
310

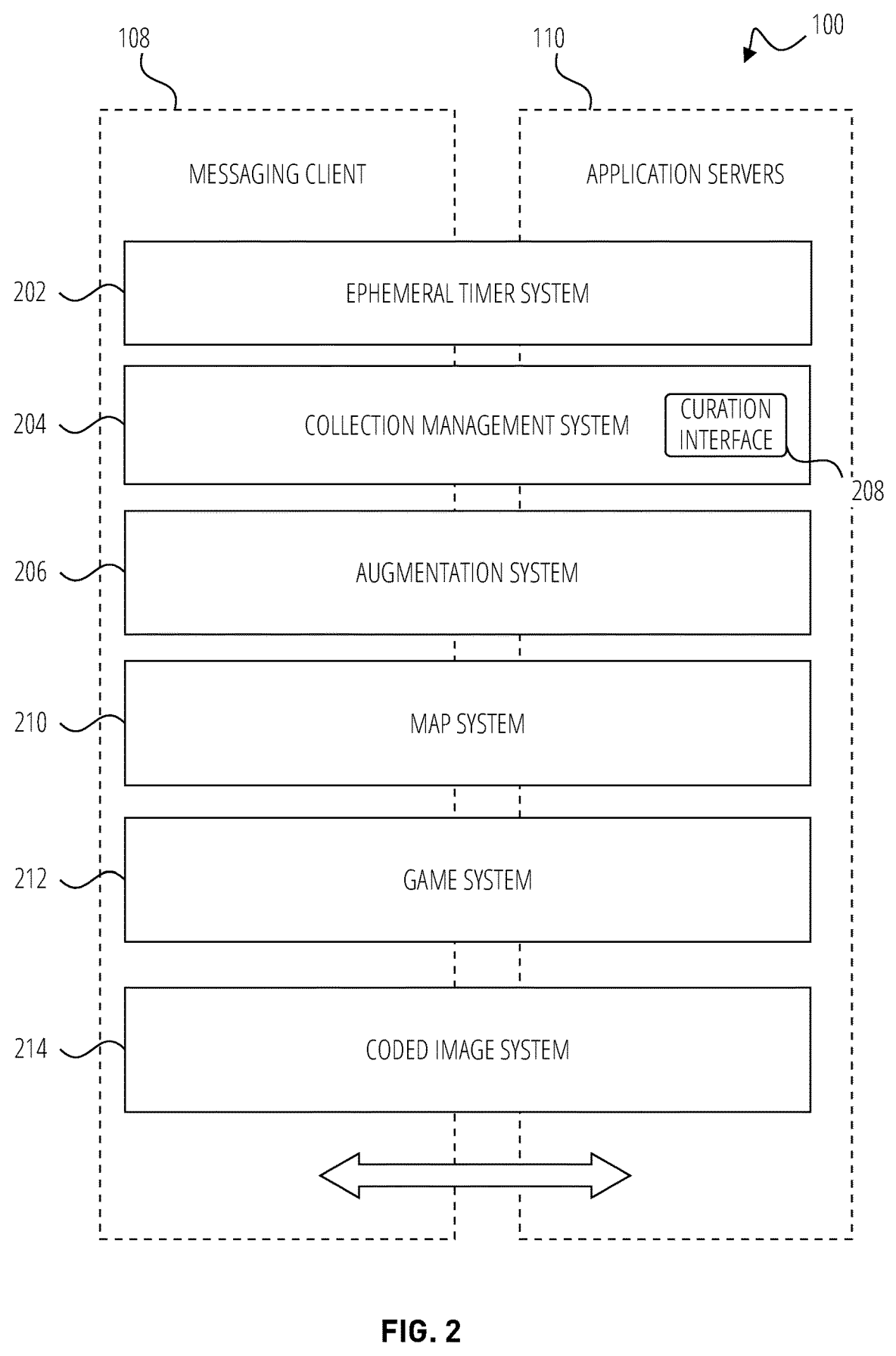

MESSAGING CLIENT                    APPLICATION SERVERS

202    EPHEMERAL TIMER SYSTEM

204    COLLECTION MANAGEMENT SYSTEM    | CURATION INTERFACE |

208

206    AUGMENTATION SYSTEM

210    MAP SYSTEM

212    GAME SYSTEM

214    CODED IMAGE SYSTEM

FIG. 2

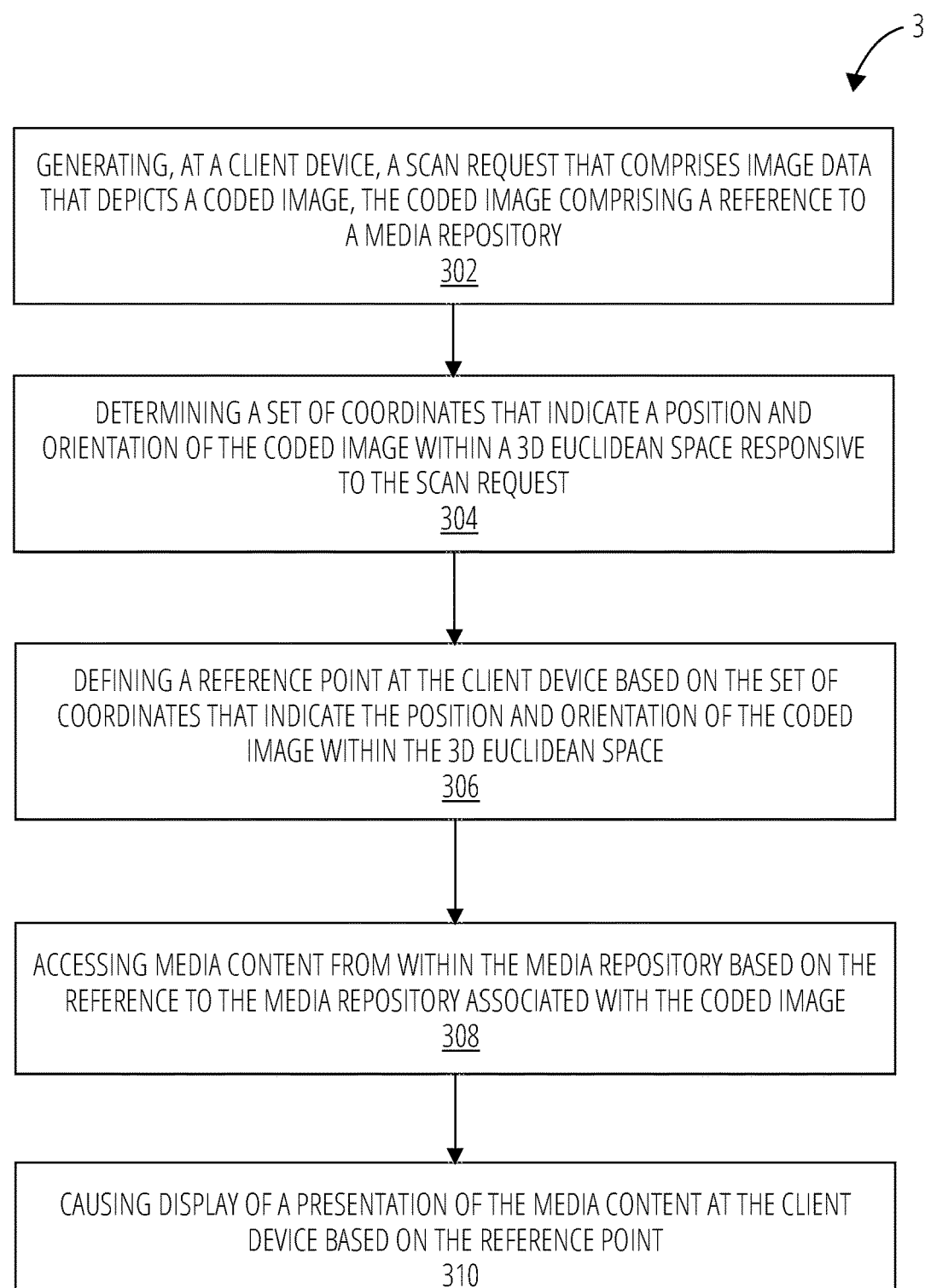

GENERATING, AT A CLIENT DEVICE, A SCAN REQUEST THAT COMPRISES IMAGE DATA THAT DEPICTS A CODED IMAGE, THE CODED IMAGE COMPRISING A REFERENCE TO A MEDIA REPOSITORY
302

DETERMINING A SET OF COORDINATES THAT INDICATE A POSITION AND ORIENTATION OF THE CODED IMAGE WITHIN A 3D EUCLIDEAN SPACE RESPONSIVE TO THE SCAN REQUEST
304

DEFINING A REFERENCE POINT AT THE CLIENT DEVICE BASED ON THE SET OF COORDINATES THAT INDICATE THE POSITION AND ORIENTATION OF THE CODED IMAGE WITHIN THE 3D EUCLIDEAN SPACE
306

ACCESSING MEDIA CONTENT FROM WITHIN THE MEDIA REPOSITORY BASED ON THE REFERENCE TO THE MEDIA REPOSITORY ASSOCIATED WITH THE CODED IMAGE
308

CAUSING DISPLAY OF A PRESENTATION OF THE MEDIA CONTENT AT THE CLIENT DEVICE BASED ON THE REFERENCE POINT
310

FIG. 3

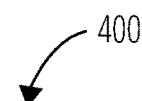
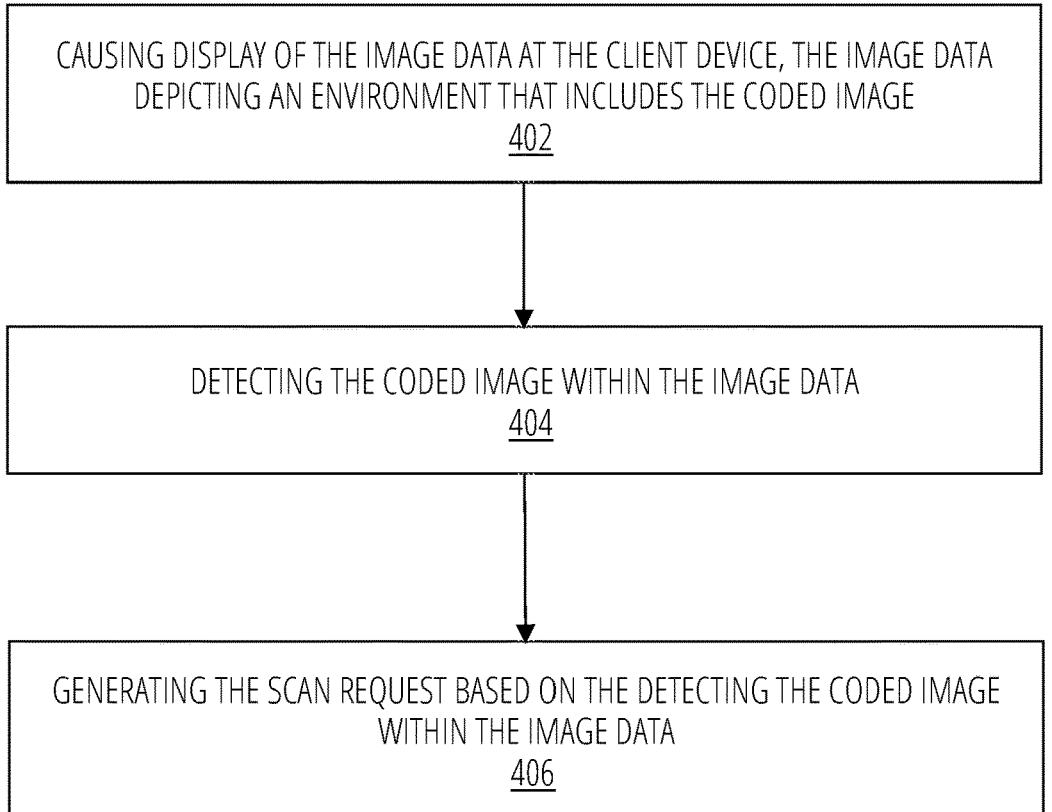
CAUSING DISPLAY OF THE IMAGE DATA AT THE CLIENT DEVICE, THE IMAGE DATA DEPICTING AN ENVIRONMENT THAT INCLUDES THE CODED IMAGE
402
DETECTING THE CODED IMAGE WITHIN THE IMAGE DATA
404
GENERATING THE SCAN REQUEST BASED ON THE DETECTING THE CODED IMAGE WITHIN THE IMAGE DATA
406
FIG. 4

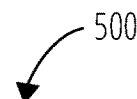
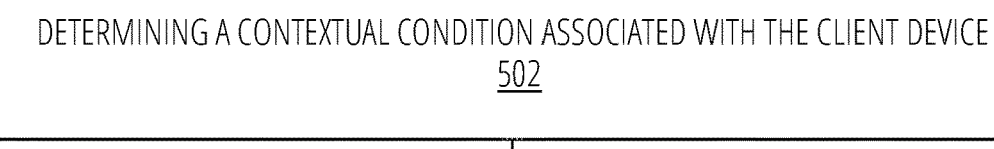
DETERMINING A CONTEXTUAL CONDITION ASSOCIATED WITH THE CLIENT DEVICE
502
CAUSING DISPLAY OF THE PRESENTATION OF THE MEDIA CONTENT BASED ON THE
CONTEXTUAL CONDITION
504
FIG. 5

SCANNABLE CODES AS LANDMARKS FOR AUGMENTED-REALITY CONTENT

BACKGROUND

Augmented reality (AR) is an interactive experience that combines the real world and computer-generated content. AR can be defined as a system that incorporates three basic features: a combination of real and virtual worlds, real-time interaction, and accurate 3D registration of virtual and real objects. The overlaid sensory information can be constructive (i.e. additive to the natural environment), or destructive (i.e. masking of the natural environment). This experience is seamlessly interwoven with the physical world such that it is perceived as an immersive aspect of the real environment. In this way, augmented reality alters one's ongoing perception of a real-world environment, whereas virtual reality completely replaces the user's real-world environment with a simulated one.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which:

FIG. 1 is a diagrammatic representation of a networked environment in which the present disclosure may be deployed, in accordance with some examples.

FIG. 2 is a diagrammatic representation of a messaging system, in accordance with some examples, that has both client-side and server-side functionality.

FIG. 3 is a flowchart depicting a method for providing a display of augmented reality content, in accordance with one embodiment.

FIG. 4 is a flowchart depicting a method for providing a display of augmented reality content, in accordance with one embodiment.

FIG. 5 is a flowchart depicting a method for providing a display of augmented reality content, in accordance with one embodiment.

DETAILED DESCRIPTION

Figure 6:
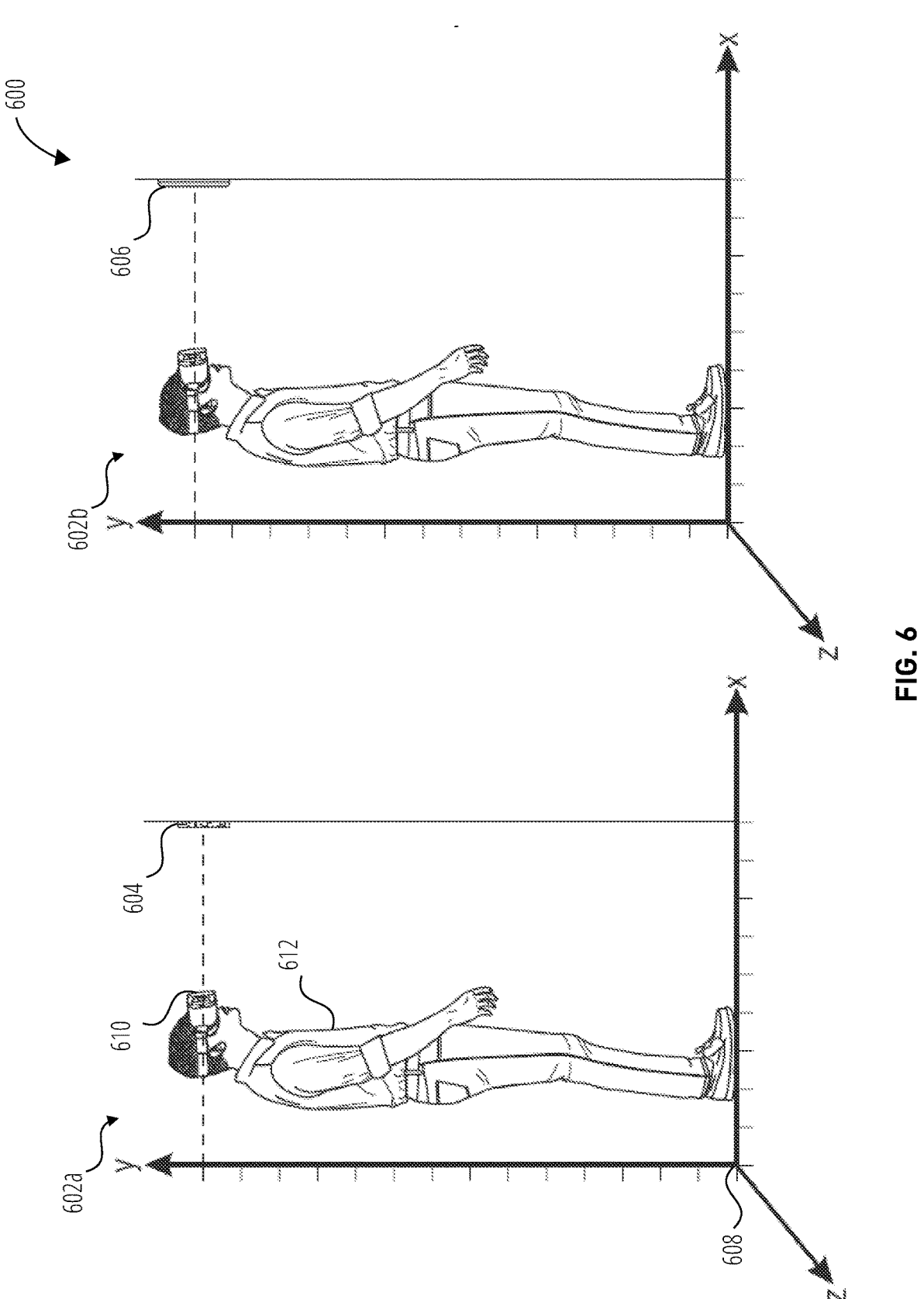
FIG. 6 is a diagram depicting a method for providing a display of augmented reality content, in accordance with one embodiment.

Devices configured to display AR content rely on smoothly overlaying the virtual world (i.e., AR content) on top of the real one. Various mechanisms exist for aligning AR content. For example, in order to display AR content, a system may employ methods for correctly estimating the movement of a camera or a target object. Moreover, to achieve precise alignment of the real and virtual view, the AR content may be anchored to a real-world object. Thus, knowledge of the position and orientation of the user's viewpoint is needed with respect to the real-world object, and the orientation of the object. Thus, the relationship between two coordinate systems needs to be defined, one attached to the user's head, the other attached to the object. Accordingly, a system to provide precise alignment of real-world objects with AR content is disclosed herein.

According to certain example embodiments, a system may be configured to perform operations that include: generating, at a client device, a scan request that comprises image data, the image data comprising a depiction of a coded image that comprises a reference to a media repository; determining a set of coordinates that indicate a position and orientation of the coded image within a three-dimensional (3D) Euclidean space responsive to the scan request; defining a reference point at the client device based on the set of coordinates that indicate the position and orientation of the coded image within the 3D Euclidean space; accessing media content from within the media repository based on the reference to the media content associated with the coded image, wherein the media content may include AR content; and causing display of a presentation of the media content at the client device based on the reference point.

In some embodiments, the coded image may comprise one or more features to indicate an orientation of the coded image relative to the 3D Euclidean space. Accordingly, the system may access the media content and display a presentation of the media content based on factors that include the position and orientation of the coded image.

In some embodiments, the scan request may be generated by the system responsive to detecting a display of the coded image within the image data. For example, the coded image may include a quick response (QR) code which comprises instructions that cause a client device to execute a request to access and display AR content associated with the QR code.

In some embodiments, the media content may be selected from the media repository based on one or more attributes of the scan request that include: device attributes of the client device; user attributes associated with a user of the client device, based on user profile data associated with the client device; contextual data, such as location data or temporal data; as well as the position and orientation of the coded image within the 3D Euclidean space. For example, in some embodiments, the system may select a media category from among a plurality of media categories based on a position and orientation of the coded image within the 3D Euclidean space, and then select media content from within the media category based on other factors, such as user profile data.

As an illustrative example, the system may determine the position and orientation of the coded image based on a set of coordinates generated by the client device, wherein the set of coordinates indicate the position and orientation of the coded image within a 3D Euclidean space. Accordingly, upon determining that the coded image is placed horizontally within the 3D Euclidean space, the system may access a first media category. Similarly, upon determining that the coded image is placed vertically within the 3D Euclidean space, the system may access a second media category. The system may thereby select media content from the corresponding media category based on user profile data, or device data associated with the requesting client device, in order to display a presentation of the AR content at the client device.

Networked Computing Environment

Figure 1:
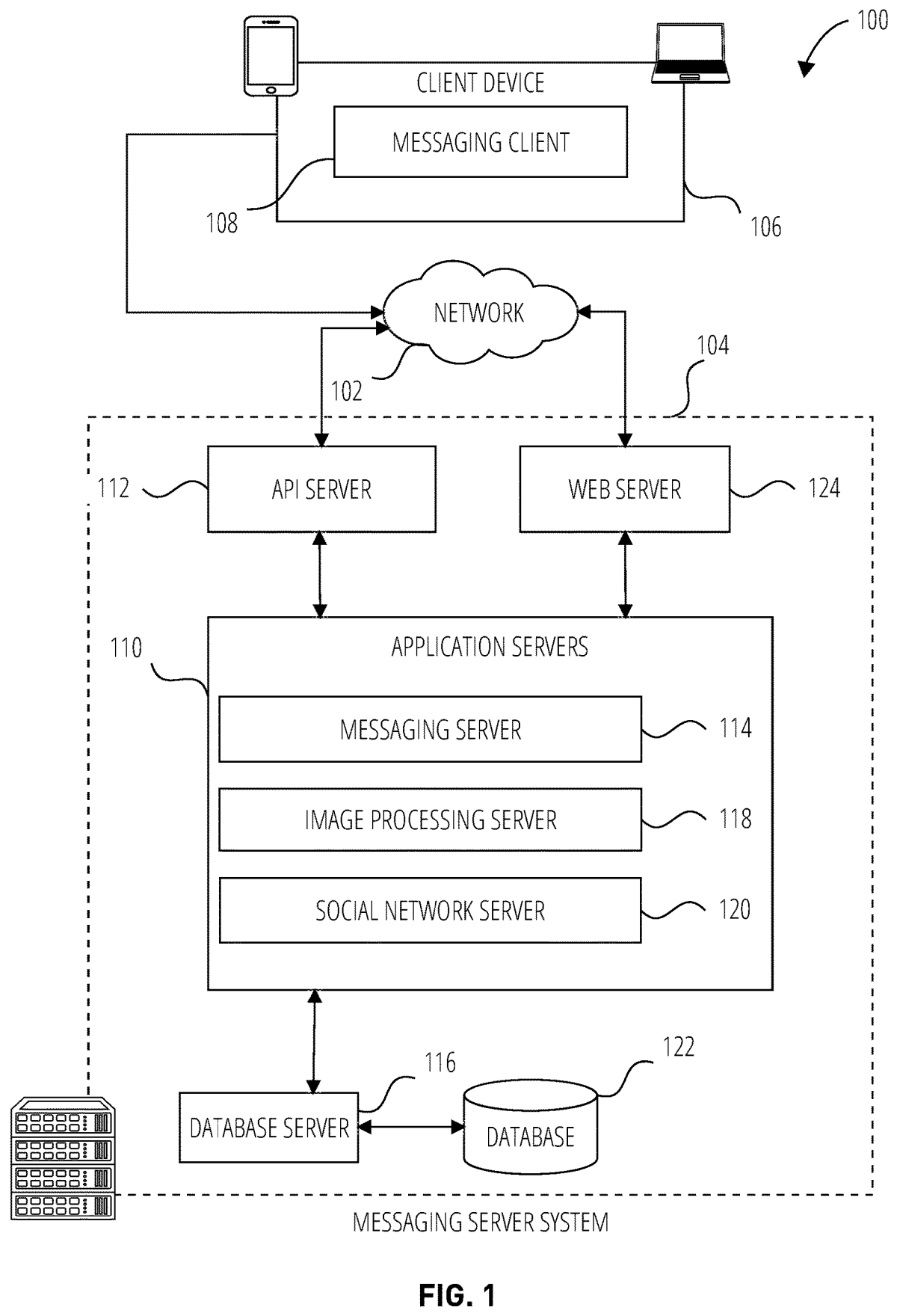

FIG. 1 is a block diagram showing an example messaging system 100 for exchanging data (e.g., messages and associated content) over a network. The messaging system 100 includes multiple instances of a client device 106, each of which hosts a number of applications, including a messaging client 108. Each messaging client 108 is communicatively coupled to other instances of the messaging client 108 and a messaging server system 104 via a network 102 (e.g., the internet).

A messaging client 108 is able to communicate and exchange data with another messaging client 108 and with the messaging server system 104 via the network 102. The data exchanged between messaging client 108, and between a messaging client 108 and the messaging server system 104, includes functions (e.g., commands to invoke functions) as well as payload data (e.g., text, audio, video or other multimedia data).

The messaging server system 104 provides server-side functionality via the network 102 to a particular messaging client 108. While certain functions of the messaging system 100 are described herein as being performed by either a messaging client 108 or by the messaging server system 104, the location of certain functionality either within the messaging client 108 or the messaging server system 104 may be a design choice. For example, it may be technically preferable to initially deploy certain technology and functionality within the messaging server system 104 but to later migrate this technology and functionality to the messaging client 108 where a client device 106 has sufficient processing capacity.

The messaging server system 104 supports various services and operations that are provided to the messaging client 108. Such operations include transmitting data to, receiving data from, and processing data generated by the messaging client 108. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 108.

Turning now specifically to the messaging server system 104, an Application Program Interface (API) server 112 is coupled to, and provides a programmatic interface to, application servers 110. The application servers 110 are communicatively coupled to a database server 116, which facilitates access to a database 122 that stores data associated with messages processed by the application servers 110. Similarly, a web server 124 is coupled to the application servers 110, and provides web-based interfaces to the application servers 110. To this end, the web server 124 processes incoming network requests over the Hypertext Transfer Protocol (HTTP) and several other related protocols. In certain embodiments, the database 122 may include a decentralized database.

The Application Program Interface (API) server 112 receives and transmits message data (e.g., commands and message payloads) between the client device 106 and the application servers 110. Specifically, the Application Program Interface (API) server 112 provides a set of interfaces (e.g., routines and protocols) that can be called or queried by the messaging client 108 in order to invoke functionality of the application servers 110. The Application Program Interface (API) server 112 exposes various functions supported by the application servers 110, including account registration, login functionality, the sending of messages, via the application servers 110, from a particular messaging client 108 to another messaging client 108, the sending of media files (e.g., images or video) from a messaging client 108 to a messaging server 114, and for possible access by another messaging client 108, the settings of a collection of media data (e.g., story), the retrieval of a list of friends of a user of a client device 106, the retrieval of such collections, the retrieval of messages and content, the addition and deletion of entities (e.g., friends) to an entity graph (e.g., a social graph), the location of friends within a social graph, and opening an application event (e.g., relating to the messaging client 108).

The application servers 110 host a number of server applications and subsystems, including for example a messaging server 114, an image processing server 118, and a social network server 120. The messaging server 114 implements a number of message processing technologies and functions, particularly related to the aggregation and other processing of content (e.g., textual and multimedia content) included in messages received from multiple instances of the messaging client 108. As will be described in further detail, the text and media content from multiple sources may be aggregated into collections of content (e.g., called stories or galleries). These collections are then made available to the messaging client 108. Other processor and memory intensive processing of data may also be performed server-side by the messaging server 114, in view of the hardware requirements for such processing.

The application servers 110 also include an image processing server 118 that is dedicated to performing various image processing operations, typically with respect to images or video within the payload of a message sent from or received at the messaging server 114.

The social network server 120 supports various social networking functions and services and makes these functions and services available to the messaging server 114. Examples of functions and services supported by the social network server 120 include the identification of other users of the messaging system 100 with which a particular user has relationships or is "following," and also the identification of other entities and interests of a particular user.

System Architecture

FIG. 2 is a block diagram illustrating further details regarding the messaging system 100, according to some examples. Specifically, the messaging system 100 is shown to comprise the messaging client 108 and the application servers 110. The messaging system 100 embodies a number of subsystems, which are supported on the client-side by the messaging client 108 and on the sever-side by the application servers 110. These subsystems include, for example, an ephemeral timer system 202, a collection management system 204, an augmentation system 206, a map system 210, a game system 212, and a coded image system 214.

The ephemeral timer system 202 is responsible for enforcing the temporary or time-limited access to content by the messaging client 108 and the messaging server 114. The ephemeral timer system 202 incorporates a number of timers that, based on duration and display parameters associated with a message, or collection of messages (e.g., a story), selectively enable access (e g, for presentation and display) to messages and associated content via the messaging client 108. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 108.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 108 based on a geolocation of the client device 106. In another example, the augmentation system 206 operatively supplies a media overlay to the messaging client 108 based on other information, such as social network information of the user of the client device 106. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 106. For example, the media overlay may include text or image that can be overlaid on top of a photograph taken by the client device 106. In another example, the media overlay includes an identification of a location overlay (e.g., Venice beach), a name of a live event, or a name of a merchant overlay (e.g., Beach Coffee House) In another example, the augmentation system 206 uses the geolocation of the client device 106 to identify a media overlay that includes the name of a merchant at the geolocation of the client device 106. The media overlay may include other indicia associated with the merchant. The media overlays may be stored in the database 122 and accessed through the database server 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 210 provides various geographic location functions, and supports the presentation of map-based media content and messages by the messaging client 108. For example, the map system 210 enables the display of user icons or avatars on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 108. A user can furthermore share his or her location and status information (e.g., using an appropriate status avatar) with other users of the messaging system 100 via the messaging client 108, with this location and status information being similarly displayed within the context of a map interface of the messaging client 108 to selected users.

The game system 212 provides various gaming functions within the context of the messaging client 108. The messaging client 108 provides a game interface providing a list of available games that can be launched by a user within the context of the messaging client 108, and played with other users of the messaging system 100. The messaging system 100 further enables a particular user to invite other users to participate in the play of a specific game, by issuing invitations to such other users from the messaging client 108. The messaging client 108 also supports both the voice and text messaging (e.g., chats) within the context of gameplay, provides a leaderboard for the games, and also supports the provision of in-game rewards (e.g., coins and items).

According to certain embodiments, the coded image system 214 provides functions that may include: generating, at a client device 106, a scan request that comprises image data, the image data comprising a depiction of a coded image that comprises a reference to a media repository, such as the database 122; determining a set of coordinates that indicate a position and orientation of the coded image within a 3D Euclidean space responsive to the scan request; defining a reference point at the client device 106 based on the set of coordinates that indicate the position and orientation of the coded image within the 3D Euclidean space; accessing media content from within the media repository (i.e., the database 122) based on the reference to the media content associated with the coded image; and causing display of a presentation of the media content at the client device 106 based on the reference point.

FIG. 3 is a flowchart illustrating operations of a coded image system 214 in performing a method 300 for providing a display of augmented reality content, in accordance with one embodiment. Operations of the method 300 may be performed by one or more subsystems of the messaging system 100 described above with respect to FIG. 2, such as the coded image system 214. As shown in FIG. 3, the method 300 includes one or more operations 302, 304, 306, 308, and 310.

At operations 302, the client device 106 generates a scan request to the coded image system 214, wherein the scan request comprises image data that depicts an environment that includes a display of a coded image, and wherein the coded image comprises a reference to a media repository.

At operation 304, responsive to the scan request, the client device 106 determines a set of coordinates that indicate a position and orientation of the coded image within a 3D Euclidean space. For example, the position and orientation may be determined based on a gyroscope associated with the client device 106, location data associated with the client device 106, as well as one or more features or attributes associated with the coded image.

At operation 306, the coded image system 214 causes the client device 106 defines a reference point within the 3D Euclidean space based on the set of coordinates that indicate the position and orientation of the coded image.

At operation 308, the coded image system 214 accesses media content from within a media repository based on the scan request received from the client device 106. For example, the coded image system 214 may access media content from within a database 122 based on attributes of the request that may include: device attributes of the client device; user attributes associated with a user of the client device, based on user profile data associated with the client device; contextual data, such as location data or temporal data; as well as the position and orientation of the coded image within the 3D Euclidean space.

At operation 310, the client device 106 generates and causes display of a presentation of the media content based on the reference point, and in some embodiments based on attributes of the media content itself.

FIG. 4 is a flowchart illustrating operations of a coded image system 214 in performing a method 400 for providing a display of augmented reality content, in accordance with one embodiment. Operations of the method 400 may be performed by one or more subsystems of the messaging system 100 described above with respect to FIG. 2, such as the coded image system 214. As shown in FIG. 4, the method 400 includes one or more operations 402, 404, and 406. In some embodiments, operations of the method 400 may be performed as a precursor or subroutine of one or more operations of the method 300, such as operation 302.

At operation 402, the client device 106 displays image data within a GUI, wherein the image data comprises a depiction of an environment that includes the coded image. For example, the coded image may include a QR code displayed upon a surface within the environment depicted by the image data.

At operation 404, the coded image system 214 detects the display of the coded image within the image data. For example, the coded image system 214 may employ one or more object or pattern recognition techniques to detect a display of the coded image based on image features associated with the coded image.

At operation 406, the coded image system 214 causes the client device 106 to generate the scan request responsive to detecting the coded image within the image data displayed at the client device 106.

FIG. 5 is a flowchart illustrating operations of a coded image system 214 in performing a method 500 for providing a display of augmented reality content, in accordance with one embodiment. Operations of the method 500 may be performed by one or more subsystems of the messaging system 100 described above with respect to FIG. 2, such as the coded image system 214. As shown in FIG. 5, the method 500 includes one or more operations 502 and 504. In some embodiments, operations of the method 500 may be performed as a precursor or subroutine of one or more operations of the method 300, such as operation 310.

At operation 502, the coded image system 214 determines a contextual condition associated with the client device 106. For example, responsive to receiving the scan request from the client device 106, the coded image system 214 may determine a contextual condition associated with the client device 106, wherein the contextual condition includes one or more of: device attributes associated with the client device 106; temporal data; location data; as well as user profile data.

At operation 504, the client device 106 causes display of a presentation of the media content based on the contextual condition associated with the client device 106. As an illustrative example, one or more feature associated with the media content may be generated based on the contextual condition.

FIG. 6 is a diagram 600 depicting a method for providing a display of augmented reality content, in accordance with one embodiment. As seen in the diagram 602a, a user 612 may view a coded image 604 via an augmented-reality display device 610 (i.e., AR glasses) within a 3D Euclidean space represented by the axes 608.

As discussed in the methods 300, 400, and 500, upon detecting the coded image 604, a coded image system 214 may determine a position and orientation of the coded image 604 within the 3D Euclidean space represented by the axes 608, wherein the position and orientation comprise a set of coordinates. As seen in the diagram 602b, the coded image system 214 may access media content 606 from within a repository based on features of the coded image 604, in order to cause the AR device 610 display the media content 606 at a position within an AR interface based on the set of coordinates associated with the coded image 604.

Figure 7:
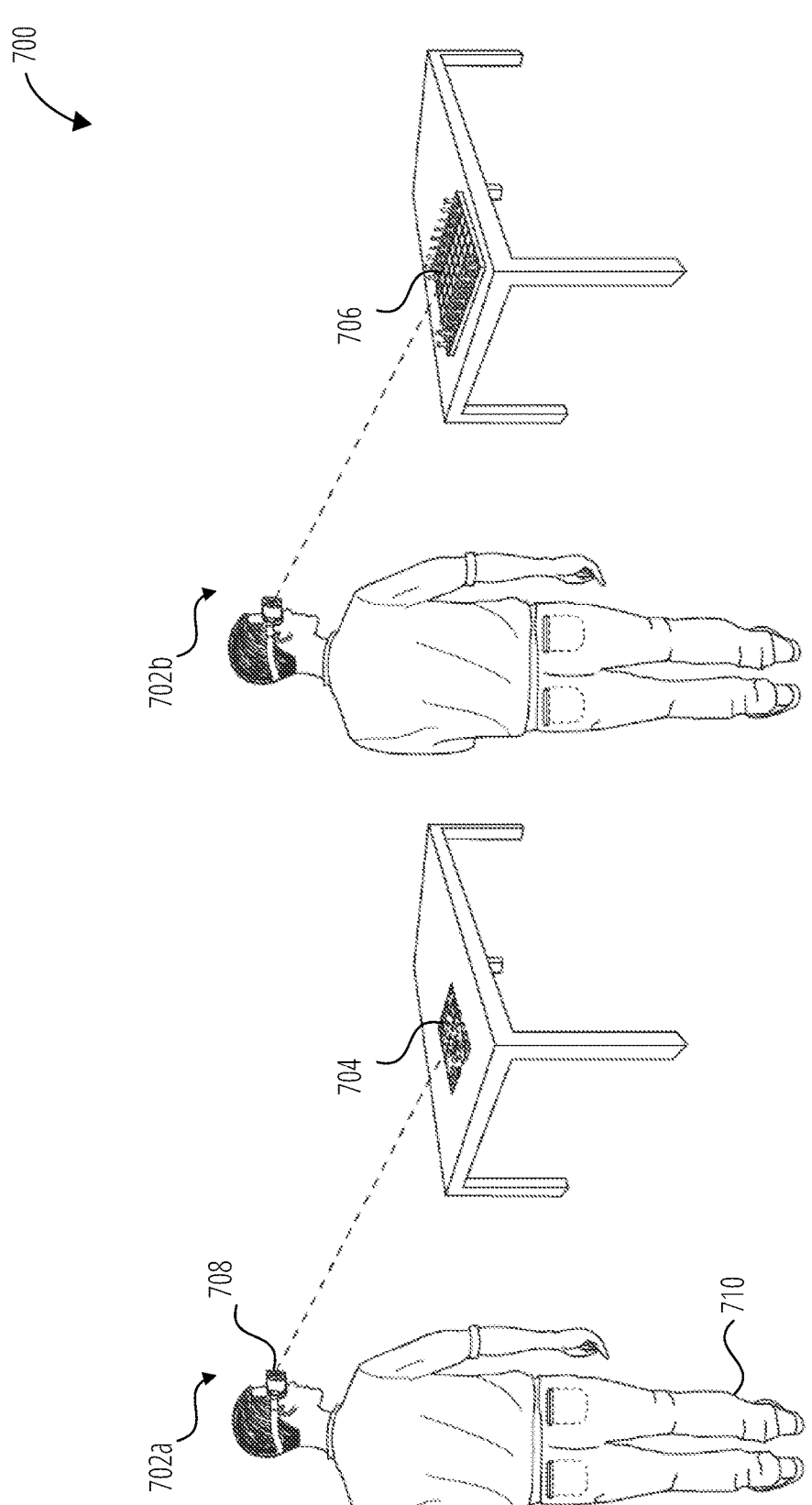
FIG. 7 is a diagram depicting a method for providing a display of augmented reality content, in accordance with one embodiment.

FIG. 7 is a diagram depicting a method 700 for providing a display of augmented reality content, in accordance with one embodiment.

A seen in the diagram 702a, a user 710 may view a coded image 704 via an AR device 708. For example, the AR device 708 may include AR glasses, or a mobile device configured to provide an AR interface.

As discussed in the methods 300, 400, and 500, the coded image system 214 may detect the display of the coded image 704 at a position within a 3D Euclidean space as seen in the diagram 702a, in order to generate and display AR content 706, as depicted in the diagram 702b.

In some embodiments, the AR content may be selected from a repository of media content based on attributes of the coded image 704, attributes of the AR device 708, user attributes of a user 710, one or more contextual factors, such as location data, temporal data, as well as a position and orientation of the coded image 704 within the 3D Euclidean space.

Machine Architecture

Figure 8:
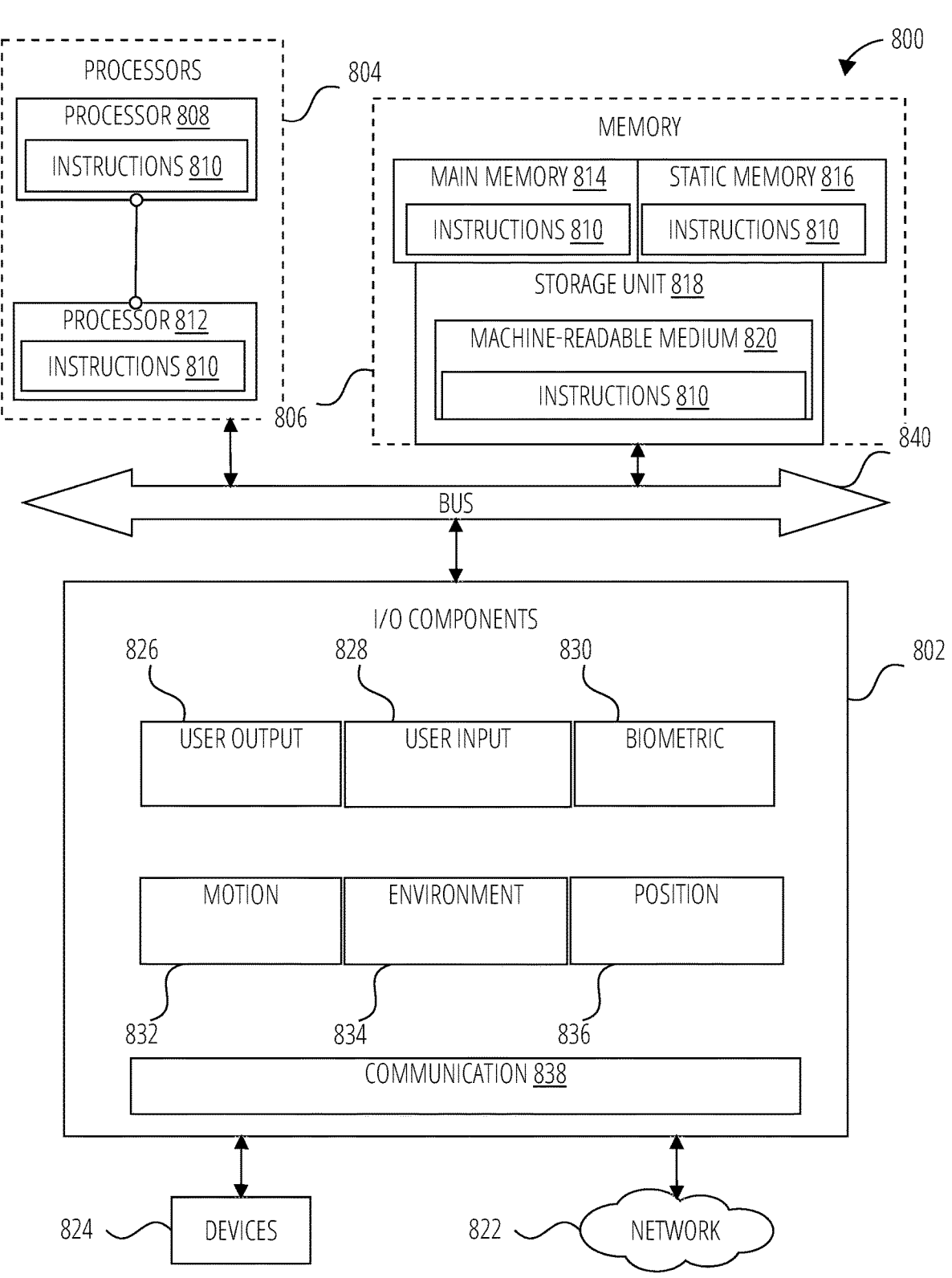
FIG. 8 is a diagrammatic representation of a machine in the form of a computer system within which a set of instructions may be executed for causing the machine to perform any one or more of the methodologies discussed herein, in accordance with some examples.

FIG. 8 is a diagrammatic representation of the machine 800 within which instructions 810 (e.g., software, a program, an application, an applet, an app, or other executable code) for causing the machine 800 to perform any one or more of the methodologies discussed herein may be executed. For example, the instructions 810 may cause the machine 800 to execute any one or more of the methods described herein. The instructions 810 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 810, sequentially or otherwise, that specify actions to be taken by the machine 800. Further, while only a single machine 800 is illustrated, the term "machine" shall also be taken to include a collection of machines that individually or jointly execute the instructions 810 to perform any one or more of the methodologies discussed herein. The machine 800, for example, may comprise the client device 106 or any one of a number of server devices forming part of the messaging server system 104. In some examples, the machine 800 may also comprise both client and server systems, with certain operations of a particular method or algorithm being performed on the server-side and with certain operations of the particular method or algorithm being performed on the client-side.

The machine 800 may include processors 804, memory 806, and input/output I/O components 638, which may be configured to communicate with each other via a bus 840. In an example, the processors 804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 808 and a processor 812 that execute the instructions 810. The term "processor" is intended to include multi-core processors that may comprise two or more independent processors (sometimes referred to as "cores") that may execute instructions contemporaneously. Although FIG. 8 shows multiple processors 804, the machine 800 may include a single processor with a single-core, a single processor with multiple cores (e.g., a multi-core processor), multiple processors with a single core, multiple processors with multiples cores, or any combination thereof.

The memory 806 includes a main memory 814, a static memory 816, and a storage unit 818, both accessible to the processors 804 via the bus 840. The main memory 806, the static memory 816, and storage unit 818 store the instructions 810 embodying any one or more of the methodologies or functions described herein. The instructions 810 may also reside, completely or partially, within the main memory 814, within the static memory 816, within machine-readable medium 820 within the storage unit 818, within at least one of the processors 804 (e.g., within the Processor's cache memory), or any suitable combination thereof, during execution thereof by the machine 800.

The I/O components 802 may include a wide variety of components to receive input, provide output, produce output, transmit information, exchange information, capture measurements, and so on. The specific I/O components 802 that are included in a particular machine will depend on the type of machine. For example, portable machines such as mobile phones may include a touch input device or other such input mechanisms, while a headless server machine will likely not include such a touch input device. It will be appreciated that the I/O components 802 may include many other components that are not shown in FIG. 8. In various examples, the I/O components 802 may include user output components 826 and user input components 828. The user output components 826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 802 may include biometric components 830, motion components 832, environmental components 834, or position components 836, among a wide array of other components. For example, the biometric components 830 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 832 include acceleration sensor components (e.g., accelerometer), gravitation sensor components, rotation sensor components (e.g., gyroscope).

The environmental components 834 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 106 may have a camera system comprising, for example, front cameras on a front surface of the client device 106 and rear cameras on a rear surface of the client device 106. The front cameras may, for example, be used to capture still images and video of a user of the client device 106 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 106 may also include a 360° camera for capturing 360° photographs and videos.

Further, the camera system of a client device 106 may include dual rear cameras (e.g., a primary camera as well as a depth-sensing camera), or even triple, quad or penta rear camera configurations on the front and rear sides of the client device 106. These multiple cameras systems may include a wide camera, an ultra-wide camera, a telephoto camera, a macro camera and a depth sensor, for example.

The position components 836 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 802 further include communication components 838 operable to couple the machine 800 to a network 822 or devices 824 via respective coupling or connections. For example, the communication components 838 may include a network interface Component or another suitable device to interface with the network 822. In further examples, the communication components 838 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 824 may be another machine or any of a wide variety of peripheral devices (e.g., a peripheral device coupled via a USB).

Moreover, the communication components 838 may detect identifiers or include components operable to detect identifiers. For example, the communication components 838 may include Radio Frequency Identification (RFID) tag reader components, NFC smart tag detection components, optical reader components (e g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 838, such as location via Internet Protocol (IP) geolocation, location via Wi-Fi® signal triangulation, location via detecting an NFC beacon signal that may indicate a particular location, and so forth.

The various memories (e.g., main memory 814, static memory 816, and memory of the processors 804) and storage unit 818 may store one or more sets of instructions and data structures (e.g., software) embodying or used by any one or more of the methodologies or functions described herein. These instructions (e.g., the instructions 810), when executed by processors 804, cause various operations to implement the disclosed examples.

The instructions 810 may be transmitted or received over the network 822, using a transmission medium, via a network interface device (e.g., a network interface component included in the communication components 838) and using any one of several well-known transfer protocols (e.g., hypertext transfer protocol (HTTP)). Similarly, the instructions 810 may be transmitted or received using a transmission medium via a coupling (e.g., a peer-to-peer coupling) to the devices 824.

Software Architecture

Figure 9:
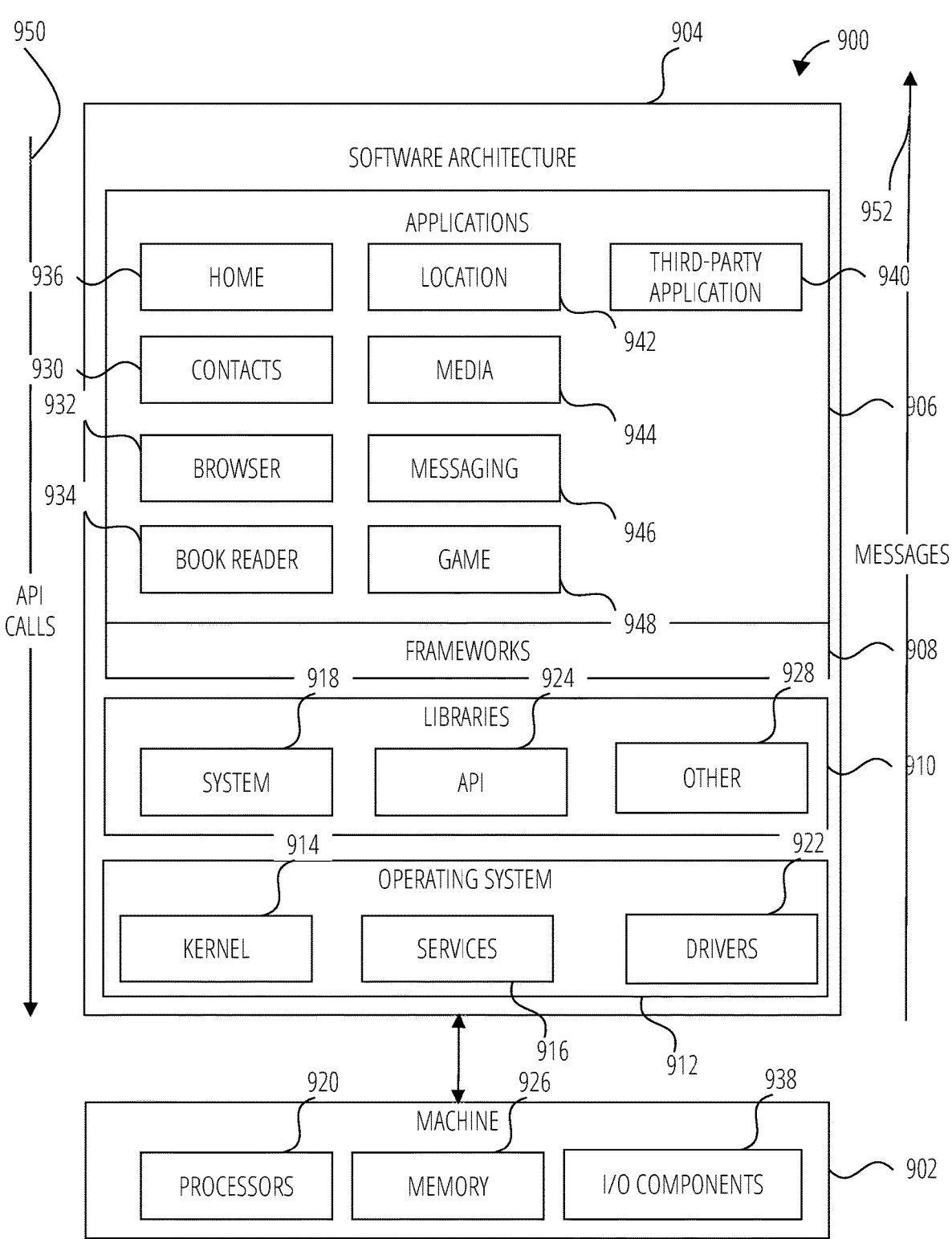
FIG. 9 is a block diagram showing a software architecture within which examples may be implemented.

FIG. 9 is a block diagram 900 illustrating a software architecture 904, which can be installed on any one or more of the devices described herein. The software architecture 904 is supported by hardware such as a machine 902 that includes processors 920, memory 926, and I/O) components 938. In this example, the software architecture 904 can be conceptualized as a stack of layers, where each layer provides a particular functionality. The software architecture 904 includes layers such as an operating system 912, libraries 910, frameworks 908, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionality. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 910 provide a common low-level infrastructure used by the applications 906. The libraries 910 can include system libraries 918 (e.g., C standard library) that provide functions such as memory allocation functions, string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e g, SQLite to provide various relational database functions), web libraries (e.g., WebKit to provide web browsing functionality), and the like. The libraries 910 can also include a wide variety of other libraries 928 to provide many other APIs to the applications 906.

The frameworks 908 provide a common high-level infrastructure that is used by the applications 906. For example, the frameworks 908 provide various graphical user interface (GUI) functions, high-level resource management, and high-level location services. The frameworks 908 can provide a broad spectrum of other APIs that can be used by the applications 906, some of which may be specific to a particular operating system or platform.

In an example, the applications 906 may include a home application 936, a contacts application 930, a browser application 932, a book reader application 934, a location application 942, a media application 944, a messaging application 946, a game application 948, and a broad assortment of other applications such as a third-party application 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the third-party application 940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 940 can invoke the API calls 950 provided by the operating system 912 to facilitate functionality described herein.

Processing Components

Figure 10:
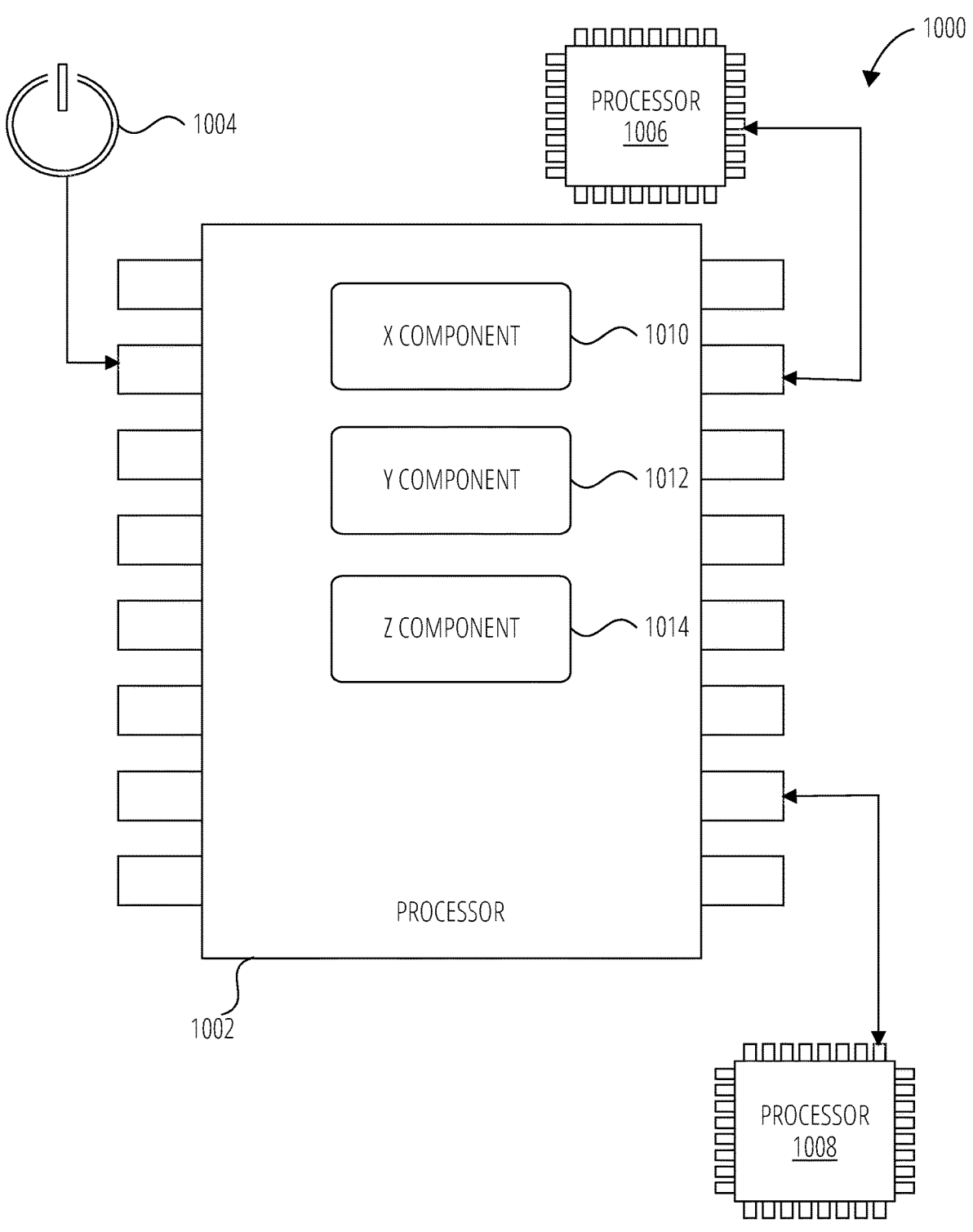
FIG. 10 is a diagrammatic representation of a processing environment, in accordance with some examples.

Turning now to FIG. 10, there is shown a diagrammatic representation of a processing environment 1000, which includes a processor 1002, a processor 1006, and a processor 1008 (e.g., a GPU, CPU or combination thereof).

The processor 1002 is shown to be coupled to a power source 1004, and to include (either permanently configured or temporarily instantiated) modules, namely an X component 1010, a Y component 1012, and a Z component 1014, operationally configured to perform operations as discussed in the method 300 of FIG. 3, and the method 400 of FIG. 4, in accordance with embodiments discussed herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API) The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/ modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:

generating, at a client device, a scan request that comprises image data, the image data comprising a depiction of a coded image that comprises one or more image features, and a reference to a media repository;

accessing gyroscope data generated by the client device responsive to the scan request;

determining a set of coordinates that indicate a position and orientation of the coded image within a three-dimensional (3D) Euclidean space based on the one or more image features of the coded image and the gyroscope data from the client device, the position and orientation including a horizontal position and orientation within the 3D Euclidean space;

defining a reference point at the client device based on the set of coordinates that indicate the position and orientation of the coded image within the 3D Euclidean space;

selecting a media category that corresponds with the horizontal position and orientation of the coded image within the 3D Euclidean space from among a plurality of media categories;

accessing media content from within the media category in the media repository based on the reference to the media content associated with the coded image; and causing display of a presentation of the media content at the client device based on the reference point.

2. The method of claim 1, wherein the media content includes augmented-reality (AR) content.

3. The method of claim 2, wherein the causing display of the presentation of the media content at the client device based on the reference point includes:

causing display of the AR content at the position and orientation of the coded image within the 3D Euclidean space.

4. The method of claim 1, wherein the generating the scan request includes:

causing display of the image data at the client device, the image data depicting an environment that includes the coded image;

detecting the coded image within the image data; and generating the scan request based on the detecting the coded image within the image data.

5. The method of claim 1, wherein the client device corresponds with a user profile, and wherein the accessing the media content from within the media repository is based on the reference to the media content associated with the coded image and user preferences from the user profile associated with the client device.

6. The method of claim 1, wherein the coded image comprises a Quick Response (QR) code.

7. The method of claim 1, wherein the causing display of the presentation of the media content at the client device based on the reference point includes:

determining a contextual condition associated with the client device; and wherein the presentation of the media content is based on the contextual condition.

8. The method of claim 7, wherein the contextual condition is based on temporal data.

9. The method of claim 1, wherein the accessing the media content from within the media repository is based on the reference to the media content and the position and orientation of the coded image within the 3D Euclidean space.

10. A system comprising:

a memory; and at least one hardware processor to perform operations comprising:

generating, at a client device, a scan request that comprises image data, the image data comprising a depiction of a coded image that comprises one or more image features, and a reference to a media repository;

accessing gyroscope data generated by the client device responsive to the scan request;

determining a set of coordinates that indicate a position and orientation of the coded image within a three-dimensional (3D) Euclidean space based on the one or more image features of the coded image and the gyroscope data from the client device, the position and orientation including a horizontal position and orientation within the 3D Euclidean space;

defining a reference point at the client device based on the set of coordinates that indicate the position and orientation of the coded image within the 3D Euclidean space;

selecting a media category that corresponds with the horizontal position and orientation of the coded image within the 3D Euclidean space from among a plurality of media categories;

accessing media content from within the media category in the media repository based on the reference to the media content associated with the coded image; and causing display of a presentation of the media content at the client device based on the reference point.

11. The system of claim 10, wherein the media content includes augmented-reality (AR) content.

12. The system of claim 11, wherein the causing display of the presentation of the media content at the client device based on the reference point includes:

causing display of the AR content at the position and orientation of the coded image within the 3D Euclidean space.

13. The system of claim 10, wherein the generating the scan request includes:

causing display of the image data at the client device, the image data depicting an environment that includes the coded image;

detecting the coded image within the image data; and generating the scan request based on the detecting the coded image within the image data.

14. The system of claim 10, wherein the client device corresponds with a user profile, and wherein the accessing the media content from within the media repository is based on the reference to the media content associated with the coded image and user preferences from the user profile associated with the client device.

15. The system of claim 10, wherein the coded image comprises a Quick Response (QR) code.

16. The system of claim 10, wherein the causing display of the presentation of the media content at the client device based on the reference point includes:

determining a contextual condition associated with the client device; and wherein the presentation of the media content is based on the contextual condition.

17. The system of claim 16, wherein the contextual condition is based on temporal data.

18. The system of claim 10, wherein the accessing the media content from within the media repository is based on the reference to the media content and the position and orientation of the coded image within the 3D Euclidean space.

19. A non-transitory machine-readable storage medium comprising instructions that, when executed by one or more processors of a machine, cause the machine to perform operations comprising:

generating, at a client device, a scan request that comprises image data, the image data comprising a depiction of a coded image that comprises one or more image features, and a reference to a media repository;

accessing gyroscope data generated by the client device responsive to the scan request;

determining a set of coordinates that indicate a position and orientation of the coded image within a three-dimensional (3D) Euclidean space based on the one or more image features of the coded image and the gyroscope data from the client device, the position and orientation including a horizontal position and orientation within the 3D Euclidean space;

defining a reference point at the client device based on the set of coordinates that indicate the position and orientation of the coded image within the 3D Euclidean space;

selecting a media category that corresponds with the horizontal position and orientation of the coded image within the 3D Euclidean space from among a plurality of media categories;

accessing media content from within the media category in the media repository based on the reference to the media content associated with the coded image; and causing display of a presentation of the media content at the client device based on the reference point.

* * * * *